US008256829B2

(12) United States Patent
Browne et al.

(10) Patent No.: US 8,256,829 B2
(45) Date of Patent: Sep. 4, 2012

(54) ACTIVE MATERIAL INSERTS FOR USE WITH HOLLOW STRUCTURES

(75) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 587 days.

(21) Appl. No.: 12/271,574

(22) Filed: Nov. 14, 2008

(65) Prior Publication Data

US 2009/0066115 A1    Mar. 12, 2009

Related U.S. Application Data

(63) Continuation-in-part of application No. 11/384,042, filed on Mar. 17, 2006, now Pat. No. 7,637,559, which is a continuation-in-part of application No. 11/093,271, filed on Mar. 29, 2005, now Pat. No. 7,401,846.

(51) Int. Cl.
B62D 25/00    (2006.01)

(52) U.S. Cl. ............... 296/187.02; 296/203.01; 296/205

(58) Field of Classification Search ............. 296/187.02, 296/187.03, 203.01, 205, 193.06
See application file for complete search history.

(56) References Cited

U.S. PATENT DOCUMENTS

| | | | | |
|---|---|---|---|---|
| 5,845,937 A * | | 12/1998 | Smith ........................... | 280/784 |
| 6,286,895 B1 * | | 9/2001 | Urushiyama et al. .... | 296/187.03 |
| 6,364,399 B1 * | | 4/2002 | Gibby ....................... | 296/187.06 |
| 6,641,208 B2 * | | 11/2003 | Czaplicki et al. ......... | 296/187.02 |
| 6,702,366 B1 * | | 3/2004 | Browne et al. ........... | 296/187.02 |
| 6,887,795 B2 * | | 5/2005 | Soininen et al. ............... | 438/722 |
| 6,905,138 B2 * | | 6/2005 | Borroni-Bird et al. ....... | 280/783 |
| 6,910,714 B2 * | | 6/2005 | Browne et al. ................. | 280/753 |
| 6,928,736 B2 * | | 8/2005 | Czaplicki et al. ............ | 29/897.2 |
| 6,966,602 B2 * | | 11/2005 | Mae ......................... | 296/187.03 |
| 6,991,282 B2 * | | 1/2006 | Suzuki et al. ............ | 296/187.03 |
| 7,029,044 B2 * | | 4/2006 | Browne et al. ................. | 293/137 |
| 7,063,377 B2 * | | 6/2006 | Brei et al. ................ | 296/187.09 |
| 7,108,316 B2 * | | 9/2006 | Barvosa-Carter et al. ........................ | 296/187.05 |
| 7,210,733 B2 * | | 5/2007 | Mouch et a .............. | 296/203.02 |
| 7,232,002 B2 * | | 6/2007 | Taya et al. ..................... | 180/274 |
| 7,264,271 B2 * | | 9/2007 | Barvosa-Carter et al. .... | 280/751 |
| 7,267,367 B2 * | | 9/2007 | Barvosa-Carter et al. .... | 280/753 |
| 7,278,679 B2 * | | 10/2007 | Yang et al. ..................... | 296/191 |
| 7,350,851 B2 * | | 4/2008 | Barvosa-Carter et al. ........................ | 296/187.02 |
| 7,374,231 B2 * | | 5/2008 | Aase et al. ................ | 296/187.02 |
| 7,401,845 B2 * | | 7/2008 | Alexander et al. ........ | 296/187.01 |
| 7,401,846 B2 * | | 7/2008 | Browne et al. ........... | 296/187.02 |
| 7,407,191 B2 * | | 8/2008 | Urushiyama .................. | 280/784 |
| 7,455,147 B2 * | | 11/2008 | Brei et al. ...................... | 180/274 |
| 7,547,062 B2 * | | 6/2009 | Melz et al. ................ | 296/187.12 |
| 7,582,349 B1 * | | 9/2009 | Herrera et al. ................. | 428/116 |
| 7,637,559 B2 * | | 12/2009 | Browne et al. ........... | 296/187.02 |
| 7,669,918 B2 * | | 3/2010 | Buravalla et al. ........ | 296/187.03 |
| 7,775,583 B2 * | | 8/2010 | Aase et al. ................ | 296/187.02 |
| 2006/0170243 A1 | | 8/2006 | Browne et al. | |
| 2009/0267386 A1 * | | 10/2009 | Persson ......................... | 296/205 |

* cited by examiner

*Primary Examiner* — Glenn Dayoan
*Assistant Examiner* — Gregory Blankenship

(57) ABSTRACT

A modifiable structural assembly comprising an active material based insert positioned within a hollow structural member, wherein the insert defines a first insert dimension, is configured, when activated, to change the first insert dimension to a second insert dimension, and selectively achieving the first or second dimension facilitates positioning the insert, or changes a characteristic of the assembly, such as the stiffness, damping effect, or energy absorption rate, once the insert has been positioned.

13 Claims, 2 Drawing Sheets

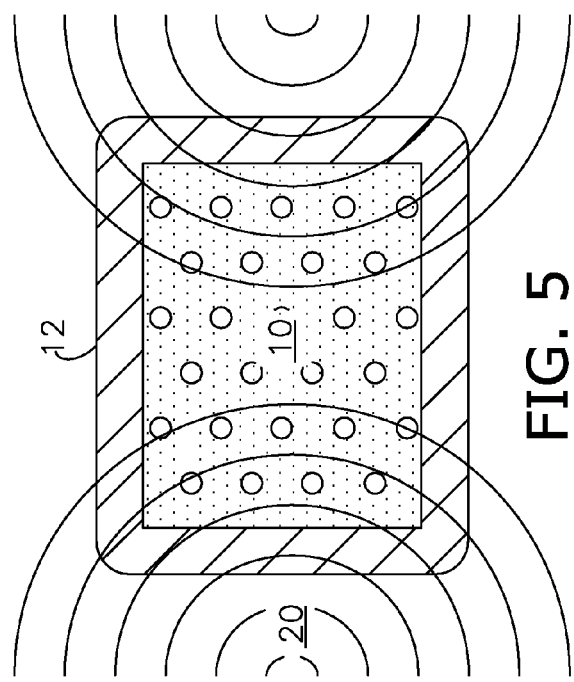
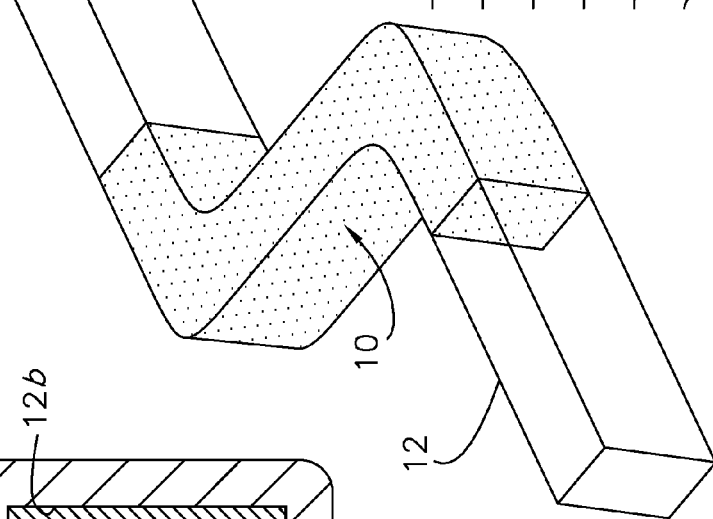
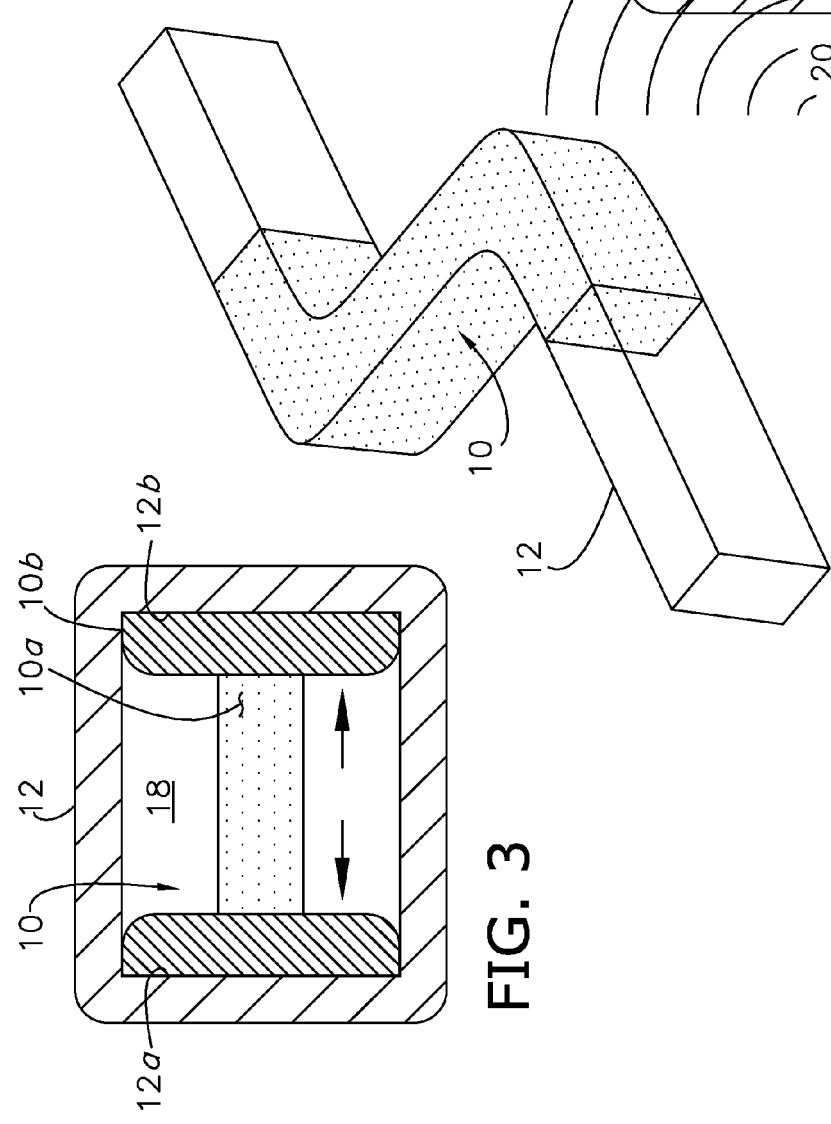

ACTIVE MATERIAL INSERTS FOR USE WITH HOLLOW STRUCTURES

CROSS-REFERENCE TO RELATED APPLICATIONS

The present application is a continuation-in-part of, and claims priority to U.S. patent application Ser. No. 11/384,042, filed on Mar. 17, 2006, and entitled "VOLUME-FILLING MECHANICAL ASSEMBLIES AND METHODS OF OPERATING SAME," which claims priority to U.S. patent application Ser. No. 11/093,271, filed on Mar. 29, 2005, which claims the benefit of U.S. Provisional Patent Application Ser. No. 60/559,249, filed on Apr. 2, 2004; U.S. patent application Ser. No. 11/092,127, filed on Mar. 29, 2005, which claims the benefit of U.S. Provisional Patent Application Ser. No. 60/559,165, filed on Apr. 2, 2004; and U.S. patent application Ser. No. 11/093,272, filed on Mar. 29, 2005, which claims the benefit of U.S. Provisional Patent Application Ser. No. 60/559,115, filed on Apr. 2, 2004; all of which are incorporated by reference in their entireties.

BACKGROUND OF THE INVENTION

1. Technical Field

The present invention relates to structural inserts adapted for use with hollow structural members, and more particularly, to a localized or global insert comprising at least one active material operable to reversibly change, upon activation or deactivation, the insertability, or a characteristic, such as stiffness, damping, geometric configuration, or the energy absorption rate of the resultant assembly.

2. Background Art

Structural inserts, such as metal plates, "I" beams 1 (prior art, FIG. 1a), "L" and "C" shaped angle irons 2,3 (FIGS. 1b,c), lattices, truces, and foam materials have been developed to provide reinforcement to hollow members 4. To effect their intended function, these inserts are often press-fitted (when engaging opposite interior surfaces), drawn, or hydroformed into place, and then joined together, typically through spot or seam welding. The lack of access to the interior of the member or its surrounding space once incorporated into a product (e.g., a vehicle), often results in an inability to retrofit the product in this manner. Alternatively, the insert may be secured in place prior to forming the hollow structural member. Once in place, the member and insert assembly cooperate to present a one-size-fits-all structural solution, wherein the resultant assembly characteristics, such as structural capacity, flexure modulus, and damping/energy absorption rate, remain constant. As a result, conventional inserts continue to present concerns in the art, including, but not limited to, the requirement of extensive labor and construction costs, as well as the inability to change or tune structural characteristics for a given condition and/or impending event. Moreover, conventional methods of placing inserts also present concerns, where attempting to retrofit an existing product.

BRIEF SUMMARY

In response to the afore-mentioned concerns, the present invention involves an active material based insert adapted for use with a hollow structure, so as to present, and a method of constructing, a modifiable assembly. As a result of the reversible change characteristics exhibited by active materials, the invention is useful among other things for selectively modifying a characteristic, such as the stiffness, damping, and crush mode/energy absorption of the assembly. In a preferred embodiment, the invention is useful for facilitating the construction of the assembly. Other advantages of the invention, include providing active field controlled tunability of the characteristic. Finally, the use of active material elements, it is appreciated, increases energy efficiency, while reducing weight and/or complexity in comparison to counterpart mechanical, material, electromechanical, hydraulic, or pneumatic based reinforcement systems.

Generally, the invention concerns a modifiable structural assembly including a hollow structural member defining an interior opening, and at least one insert securely positioned within the opening. The insert is formed at least in part of an active material operable to achieve first and second differing states when activated and deactivated respectively. The member and at least one insert are cooperatively configured to present a first assembly characteristic value when the material is in the first state, and a second value when the material is in the second state.

Other aspects and advantages of the present invention, including the employment of shape memory alloy, ferromagnetic shape memory alloy, shape memory polymer and/or magnetorheological elastomers for modifying the assembly characteristic, will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 3 is a cross-section of a hollow structure and "I"-beam insert having an active material cross-bar, in accordance with a preferred embodiment of the invention;

FIG. 4 is a perspective view of a non-linear structural member defining a bend and having an active material based insert therein, in accordance with a preferred embodiment of the invention; and FIG. 5 is a cross-section of a hollow structure, porous insert, and magnetic activation field, in accordance with a preferred embodiment of the invention.

DETAILED DESCRIPTION

Figure 1:
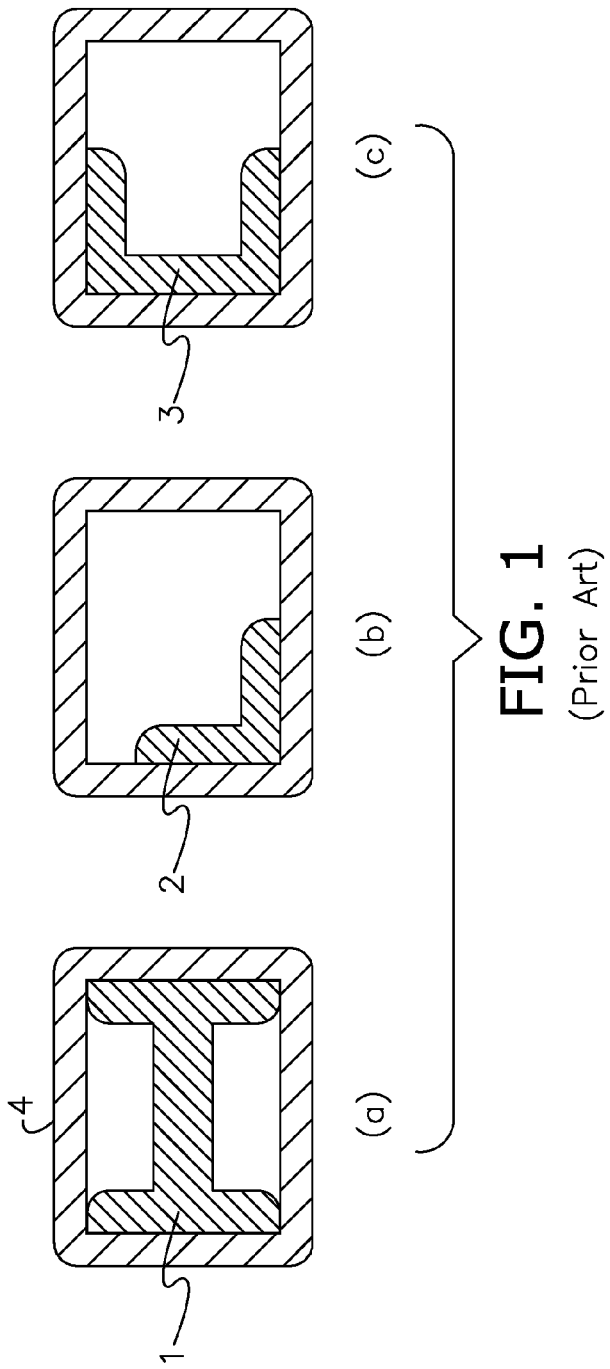
FIG. 1a is a cross-section of a prior art hollow structure and "I"-beam angle iron reinforcing insert, as known in the art.
FIG. 1b is a cross-section of a prior art hollow structure and "L"-shaped angle iron reinforcing insert, as known in the art.
FIG. 1c is a cross-section of a prior art hollow structure and "C"-shaped angle iron reinforcing insert, as known in the art.

The present invention concerns an active material based insert 10 adapted for use with a hollow structure 12, so as to form an assembly 14. More particularly, at least a portion of the insert 10 is made of an active material 10a, whose reversible changeability further described below, facilitates the construction process or effects a change in at least one characteristic of the assembly 14. In the illustrated and preferred embodiments discussed herein active material based localized inserts 10 are employed and utilized in a vehicular setting; for example, as shown in FIG. 1, a plurality of reinforcing inserts 10 may be employable by the pre-existing side rails 12 of a vehicle 16. In this configuration, the preferred inserts 10 present reduced cross-sectional areas in the activated or deactivated state (depending upon the active material selected) to facilitate insertion and placement within the rails or other structural members. Once properly positioned, each insert 10 is activated (or deactivated) so as to expand and exert a hold force against the member, thereby locking it in place. As such, the present invention provides an improved method of retrofitting the hollow members of existing vehicles or structures. Locking in place can also be fully or in part effected by the conformance of the insert upon expansion to any/all irregularities in the geometry of the hollow cross section.

It is within the ambit of the invention to utilize the benefits and advantages of the inserts 10 with other applications, such as to increase safety and improve performance with respect to commercial building construction in earthquake zones, infrastructure, or to increase safety or comfort with respect to customized furniture and equipment.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as alloys, polymers, and ceramics, ferromagnetic shape memory alloys, and magneto- and electro-rheological elastomers. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMAs are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state. Thus, they are suited for reversible shape setting of the insert 10.

As previously mentioned, suitable active materials for use in the present invention may also comprise magnetorheological (MR) or electrorheological (ER) compositions, such as MR or ER elastomers. These elements may further comprise a fluid medium. These materials rapidly change their rheological properties upon application of a magnetic field or electric voltage drop. MR elastomers (MRE's), for example, are suspensions of sub-micron sized, magnetically polarizable iron particles in a thermoset elastic polymer or rubber. The application of an external magnetic field stiffens the material due to the resultant alignment and shortening of the distance between the initially random magnetization vectors of the particles with this field; and the same mechanism is responsible for "magnetostriction", i.e. a change in length (shortening) in the direction of an external magnetic field. The MR elastomers typically develop structure when exposed to a magnetic field in as little as a few milliseconds. Discontinuing the exposure of the MRE to the magnetic field reverses the process allowing the elastomer to return to its lower modulus state. As such, it is appreciated that MRE's are well suited for applications in which it is desirable to continuously and controllably vary the effective stiffness of an insert under different operating conditions.

Though primarily described with respect to SMA's, SMP's, FSMA's, and MRE's as previously mentioned, it is well within the ambit of the invention to use other active materials, such as, for example, electroactive polymers (EAP), including polymeric materials that exhibit piezoelectric, pyroelectric, or electrostrictive properties in response to electrical or mechanical fields. With respect to piezoelectric material (PM), it is appreciated that PM may be disposed on strips of a flexible metal or ceramic sheet. The strips can be unimorph or bimorph. Preferably, the strips are bimorphic, because bimorphs generally exhibit more displacement than unimorphs.

II. Exemplary Systems, Methods, and Applications

Turning to the teachings of the present invention, exemplary embodiments of active material based inserts 10 are discussed below and illustrated in FIGS. 2-5.

In a preferred embodiment, the structure 12 forms an opening 18 defining an interior height and width, and when oriented for insertion, the insert 10 presents a maximum deactivated height and/or width less than the congruent dimension (s) of the opening 18, so as to facilitate insertion. Once positioned, the insert 10 is configured to attempt to achieve a second height or width dimension greater than the congruent dimension of the opening 18, when activated or deactivated depending upon the material selected. More particularly, where first and second interior surfaces 12a,b (FIG. 3) of the hollow structure 12 are to be engaged and define an interior cross-sectional dimension, the insert 10 is configured to present a first congruent length less than, more preferably less than eighty-five percent of, and most preferably, less than seventy-five percent of the afore-mentioned interior dimension.

Shape memory material is preferably used in this configuration. For example, and as shown in FIG. 3, the cross-bar of an "I"-beam insert 10 may be formed of shape memory material 10a, such that when activated or deactivated, it is caused to exert an outward force upon other insert structure 10b (e.g., the interconnected engaging plates of the beam).

The insert 10 may comprise SMA material in a default martensitic phase that is thermally activated to effect a martensitic to austenitic phase change. The SMA insert 10, whether foam, lattice, truss, hollow shell, porous, or otherwise is configured so as to preferably but not necessarily fully fill the opening 18 in its martensitic state. In an activated austenitic state the insert 10 is compressed/deformed to smaller dimensions, so as to permit its insertion into the opening 18. Once inserted, the insert 10 may be caused to reach its more malleable martensitic state, so as to reach otherwise hard-to-reach internal locations within the structure 12. An example of which, would be a bend region (FIG. 4) in a longitudinal rail section, where it is desirous to variously reinforce, change the stiffness, or prevent buckling.

Alternatively, the SMA insert 10 may be stress activated from an initial austentic to a martensitic state and back. In this configuration, the Austenitic SMA insert 10 is compressed until activation to the more malleable martensitic state, inserted within the opening 18, and then released, so as to allow its expansion, as the insert 10 reverts back either partially or fully to its austenitic state. It is appreciated that the Austenitic SMA insert is suitable to provide sound and vibration damping due to its significant stress/strain hysteresis loop.

As previously discussed, this aspect of the invention facilitates and presents a novel method of retrofitting existing structures. Moreover, it is appreciated that, heating components of existing manufacturing processes, such as the curing process in most automotive manufacturing processes, can be used to activate the active material inserts, so as to result in no additional power requirement.

In another embodiment, thermally activated stiffness and shape changes in SMP is utilized. In this regard, an SMP insert 10, whether foam, lattice, truss, hollow shell, porous, or otherwise and the structure 12 are cooperatively configured, such that the insert 10 preferably but not necessarily completely fills the opening 18. It is appreciated that in the higher temperature and softer state the SMP insert 10 achieves smaller dimensions, which allows it to be inserted into the opening 18. In the more malleable state, the SMP insert 10 is also able to better navigate a bend region, such as shown in FIG. 4. Once inserted, thermal activation is retained for a period of time, so as to cause the SMP insert 10 to slowly return to its original dimensions or if smaller the interior dimensions of the hollow structure 12. The thermal activation is then turned off. It is also appreciated, that as the SMP material cools, it dramatically increases in stiffness and locks in the new shape of the SMP insert 10. To remove the insert 10, or to lower the stiffness of the assembly 14, the insert 10 could be reheated. Thermal activation could be done passively, such as, for example, by heat energy generated from the engine of the vehicle 16 or as a second example in the paint oven, or through user (e.g., driver) actuated Joule heating drawing power from the charging system of the vehicle 16.

In another embodiment, FSMA activation results from the application of a magnetic field 20 and is utilized to rapidly (relative to thermal or Joule heating) manipulate the stiffness and/or shape of the insert 10 (FIG. 5). In this configuration, a one-way effect results through activation, unless the field 20 can be reversed, as it is appreciated that discontinuing the activation field 20 does not in itself revert the material 10a back to its original state. Similar to the previous embodiments, to position the insert 10, the field 20 is applied to reduce dimensions; once positioned, the field is reversed causing the insert 10 to resume or attempt to resume its previous dimensions. In another embodiment, insertion can be achieved while the insert 10 is in a malleable and deformable original state. Once positioned, the field 20 is then applied to effect an altered shape or stiffness. Again, it is appreciated that upon deactivation the insert 10 will maintain its altered state, unless the field 20 is reversed.

In yet another embodiment, magnetorheological elastomers (MREs) are used to effect stiffness and shape changes. Similar to FSMA's, MRE's, are field activated, as shown in FIG. 5; contrary to FSMA's, however, MRE's primarily present two-way effects, as it is appreciated that the change in property (e.g., stiffness and/or shape) is proportional to the strength of the applied field. Thus, to place the insert 10, the field 20 is applied to compress/deform the dimensions; once positioned the field 20 is removed, so as to restore the original dimensions. In another embodiment, insertion is achieved while the insert 10 is in a malleable and deformable original state, and application of the field 20 after placing the insert 10 is used to rapidly change the stiffness thereof.

Figure 2:
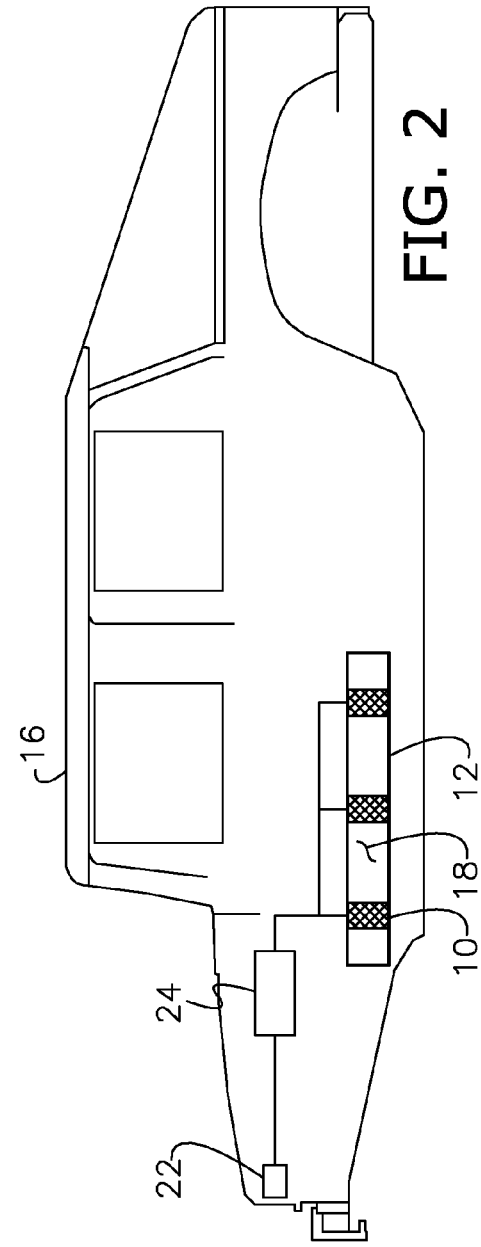
FIG. 2 is a perspective view of a modifiable assembly including a hollow structural member and a plurality of inserts comprising a vehicle, in accordance with a preferred embodiment of the invention.

In another aspect of the invention, the active material based inserts 10 can be used to selectively modify a condition, such as the stiffness, damping, and crush mode/energy absorption of the structure 12, wherein selectivity may be manually or autonomously effected. With respect to the later, the insert 10 may be communicatively coupled to at least one sensor 22 (FIG. 2) configured to detect and communicate to the insert 10, the occurrence of a condition or event. More preferably, the sensor 22 and insert 10 may be intermediately coupled by a controller 24 configured to receive data from the sensor 22, compare the data to a predetermined threshold, so as to predict or determine the condition or event, and send an activation signal to the insert 10 only when the threshold is surpassed and the condition or event is predicted or determined. For example, as shown in FIG. 2, the vehicle side rail inserts 10 may be activated only when the collision avoidance safety system of the vehicle 16 detects or predicts an imminent collision. In this respect, where SMP inserts 10 are provided, activation may be selectively used to effect an increased energy absorption zone in the frame of the vehicle 16. Thus, advantageously, a preferred embodiment of the invention provides active field controlled tunability of the assembly characteristic.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A modifiable structural assembly adapted to enable assembly and/or increase structural capacity, so as to retrofit an existing structure, through active material actuation, comprising:
   a hollow and integrally formed structural member defining a continuous wall, laterally enclosed space, and interior opening; and
   at least one I-beam insert securely positioned within the opening, and having a cross-bar formed at least in part of an active material operable to selectively achieve first and second differing states when activated and deactivated respectively,
   said member and at least one insert being cooperatively configured to present a first assembly characteristic value when the material is in the first state, and a second value when the material is in the second state.

2. The assembly claimed in claim 1, wherein the existing structure is a vehicle, the member is a frame component of the vehicle, and the assembly characteristic value is the magnitude of energy absorption by the member during a crash event.

3. The assembly claimed in claim 2, wherein the material is passively activated by heat energy generated by or applied to the vehicle.

4. The assembly claimed in claim 1, wherein the opening defines a first internal dimension, and the insert when inserted and activated congruently defines a second dimension less than the first, and attempts to define a third dimension approximately equal to or greater than the first when inserted and deactivated, so as to variously create a mechanical interlock with interior geometrical features of or exert a force upon the member.

5. The assembly claimed in claim 4, wherein the second dimension is less than eighty-five percent of the first.

6. The assembly claimed in claim 1, further comprising:
   at least one sensor communicatively coupled to the insert, configured to determine an event, and operable to cause the material to be activated when the event is determined.

7. The assembly claimed in claim 6, further comprising:
   a controller communicatively coupled to said at least one sensor and insert, configured to receive data from said at least one sensor, compare the data to a predetermined threshold, and cause the material to be activated only when the threshold is exceeded.

8. The assembly claimed in claim 6, wherein the member is a frame component of a vehicle, and the event is a collision.

9. An I-beam insert adapted for use with a hollow and integrally formed structural member defining a continuous wall, a laterally enclosed space, and opposite interior surfaces, wherein the surfaces contributively define an opening and an interior dimension, the insert defines a first insert dimension and comprises an active material element configured to change the first insert dimension to a second insert dimension, one of said first and second insert dimensions being less than the interior dimension so as to facilitate insertion into the opening, and the other of said first and second insert dimensions being greater than the interior dimension.

10. A method of modifying a structural assembly including a hollow and integrally formed structural member defining a continuous wall, laterally enclosed space, and opening, said method comprising the steps of:
   a. securing the member so as to selectively engage a condition or event;
   b. securing at least one I-beam insert within the opening, wherein the insert includes a cross-bar formed at least in part of an active material operable to selectively achieve first and second differing states when activated and deactivated respectively; and
   c. activating the material so as to achieve one of said first and second states, and modifying the assembly as a result of activating the material, when the condition or event is engaged.

11. The method claimed in claim 10, wherein the material is activated by an activation signal selected from the group consisting essentially of thermal heating, stress activation, applied magnetic field, and chemical activation.

12. The method claimed in claim 10, wherein steps a) and c) further include the steps of selectively engaging sound waves and/or structural vibrations, and modifying the damping rate of the assembly as a result of activating the material.

13. The method claimed in claim 10, wherein the assembly comprises a vehicle constructed during a manufacturing process having a paint curing component, and step c) further includes the steps of activating and causing the material to achieve said one of the first and second states by heat generated during the paint curing component.

* * * * *